3,229,271
ICING INDICATOR SYSTEM
Martin S. Frant, 3200 Lescure Ave., Harrisburg, Pa.
Filed Feb. 27, 1962, Ser. No. 176,154
5 Claims. (Cl. 340—234)

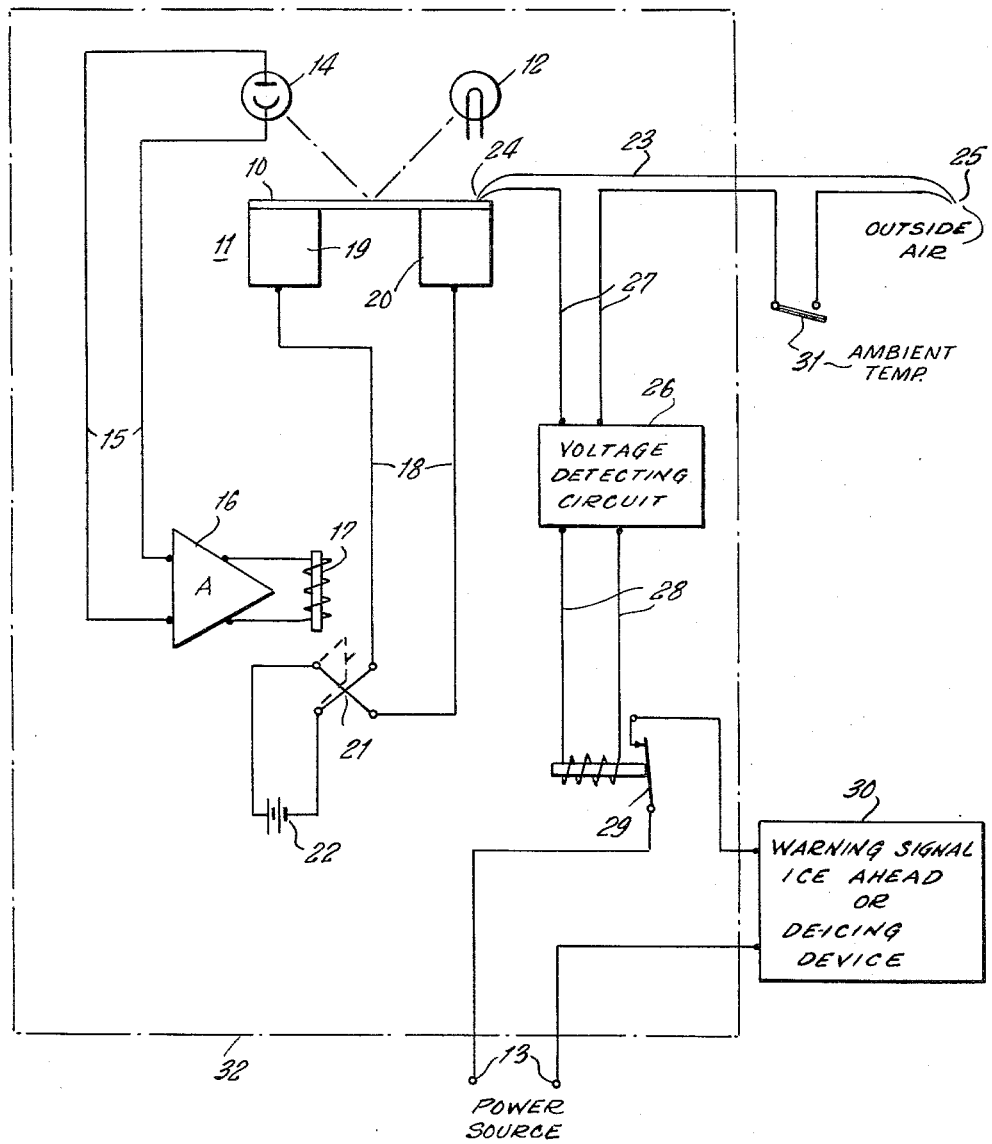

This invention relates to a system for indicating icing conditions, particularly for warning drivers and operators about hazardous driving and operating conditions at bridges and along roadways at locations where icing conditions are likely to arise or have in the past been known to arise. The system and modifications of it are useful for other purposes such as actuating de-icing equipment and in other environmental locations such as airplanes.

According to the invention, means are provided to warn drivers of vehicles about dangerous or slippery bridges, approaches thereto, ramps, curves, hills and the like or stretches of roadway due to icing conditions or weather conditions likely to cause icing by warning signs responsive to local temperature and dew-point conditions or, alternatively, to modified means applicable to airplanes, etc. which activate de-icing equipment even before ice actually begins to form. In this way, accidents and loss of life can be prevented or greatly reduced from such causes.

The invention will first be described with respect to an icing indicator or warning system for bridges, sections of roadway and the like as diagrammatically illustrated in the accompanying drawing having a single figure.

The polished metal surface 10 of the thermoelectric cooler 11 is adapted to receive a beam of light from light source 12, which can be visible light, ultraviolet light or infrared light, and which is electrically connected to the A.C. or D.C. current source of power 13 and reflected light from surface 10 impinges on and activates a cadmium sulfide or other photocell 14 connected by wiring 15 to amplifier 16 to which in turn the relay 17 is connected. Wiring 18 leads from positive and negative solenoids or armatures 19 and 20, respectively, to a di-pole di-throw switch 21 which is a reversing switch in circuit with a source 22 of low voltage high current D.C. such as a battery. The elements so far mentioned constitute a thermoelectric cooler of the general type described by Goldsmid in British Journal of Applied Physics, volume 11, June 1960, page 216 in his article entitled "Principles of Thermoelectric Devices."

A thermocouple element 23 forms at one end 24 a junction contact with polished metal surface 10 and its other end 25 is exposed to the outside air or is in contact with or in or close to a bridge, road surface, etc. The thermocouple element is provided with a voltage detecting circuit 26 of known conventional nature by lead-in wiring 27 and the leadout wiring 28 terminates adjacent the relay-operated switch 29 or its electronic equivalent, switch 29 being electrically connected to power source 13 and also to the warning device or signal 30 which when activated visibly indicates icing conditions or conditions conducive to icing. The warning device or signal 30 can be replaced by de-icing equipment of known character per se so that, instead of giving a warning, de-icing, for example of airplane wings, is effected. The thermocouple element 23 is further provided with a thermometrically operated switch 31 of bimetallic or like known nature set to close at 32° F. or other preselected or predetermined temperature such as 34° F. where conditions conducive to icing but just short thereof are to be indicated or used for control purposes.

As shown by the broken line 32, most of the equipment is located in a protective housing which can be placed in any desired or available location either near to or remote from the warning signal or de-icing equipment. In addition, one of the above described units is positioned at each location such as, for example a stretch of highway, and at each bridge, where icing is apt to occur or has been known to occur and the wiring connecting the housing contents with the power source and warning signal can be and preferably is in a groove, cut or the like formed in the roadway surface and sealed or covered by grouting. In an airplane the system is located at a point of relatively low velocity as in the wings or fuselage and away from the motors, where air velocity is most favorable for use of the invention.

The system of the present invention in effect modifies known small thermocooling devices which have no moving parts, and which can be used either for cooling or heating, by incorporating a differential thermocouple or like device such as a thermistor bridge so that the dew-point of the atmosphere is compared with the outside temperature which latter, when it falls to the dew-point or becomes lower than the dew-point, generates a signal going through a thermometric device whose contacts close or close a switch when the outside temperature falls to 32° F. or less. The generated signal is then used to operate a warning indicator or to actuate de-icing equipment or to release sand under truck or bus wheels, etc. depending on the specific application of the system. The system is "fail safe" in that if the light source should fail icing conditions would be automatically indicated or the related de-icing equipment etc. would be rendered effective. Optionally, the beam of light from the light source is divided into two or more parts and monitored by a second photocell. The devices in the system, except possibly the light source, contain solid state elements of high reliability.

The thermocooler requires current only of the order of one-sixth ampere at 28 volts. A source of low velocity air is required, as above noted, for airplane use of the system but such is available by appropriately mounting the system in the wings.

The principle on which the invention is based is the comparison of the dew-point of the air with surface temperature and with a thermostat set for 32° F. or just above that temperature. While humidity and dew-point are equal when the humidity is 100%, the two are not the same as will be understood better from the following illustrative example:

When on a particular stretch of highway at night the road temperature is 28° F., the air temperature is 34° F. and the relative humidity is 92%, ice can be forming on the road under these conditions. Dew-point measurement shows the dew-point to be 30° F. Since the dew-point temperature is higher than the roadway the warning signal or the de-icing will be actuated. However, a device which measures humidity cannot anticipate a change in humidity from contact with a colder surface. The present system is especially designed and suited for highway use and is capable of anticipating icing conditions.

It will be understood that the warning signal 30 is of any suitable or known type which becomes illuminated or flashes a steady or intermittent light or light pattern signifying icing or conditions conducive to icing, thereby causing drivers of vehicles to proceed cautiously. When the system is intended to actuate de-icing equipment, release sand, etc. on an airplane, truck or bus, closing of switch 31 brings about such results.

The system is fully automatic and requires no manual intervention, control or operation. It will further be understood that when icing conditions or conditions conducive to icing no longer exist, switch 31 re-opens rendering the system inactive but ready for active operation at all times.

The foregoing is intended as illustrative or exemplary and not as limitative since, within the terms of the appended claims, various changes may be made without departing from the scope or spirit of the invention.

What is claimed is:

1. An icing indicator system comprising a thermoelectric cooler having a polished mirror-like surface, a source of light adapted to direct a beam of light thereon and a photocell activated by the reflected light, a differential thermocouple forming a junction contact at one end with said surface and having its other end exposed to the atmosphere, a thermometric switch exposed to the atmosphere, actuatable below a predetermined temperature and connected into said thermocouple, a voltage detecting circuit electrically connected to said thermocouple, a relay-operated switch connected to said circuit and to a source of power and a warning signal electrically connected to said relay-operated switch and actuated by said system when said relay-operated switch and said thermometric switch are closed due to existing temperature and dew-point conditions which are conducive to icing.

2. A de-icing system for airplanes and other vehicles comprising a thermoelectric cooler having a polished mirror-like surface, a source of light adapted to direct a beam of light thereon and a photocell activated by the reflected beam, a differential thermocouple forming a junction contact at one end with said surface and having its other end exposed to the atmosphere, a thermometric switch exposed to the atmosphere, actuatable below a predetermined temperature and connected into said thermocouple, a voltage detecting circuit electrically connected to said thermocouple, a relay-operated switch connected to said circuit and to a source of power and de-icing equipment electrically connected to said relay-operated switch and actuated by said system when both switches are closed due to existing temperature and dew-point atmospheric conditions which are conducive to icing.

3. In a system for warning of icing conditions and for actuating de-icing equipment for roads, bridges, airplanes, trucks, buses and the like, a differential thermocouple adapted to form at one end of a junction contact with an associated thermoelectric cooler and having its other end exposed to the atmosphere, a thermometric switch exposed to the atmosphere, actuatable below a predetermined temperature and connected into said thermocouple, a voltage detecting circuit electrically connected to said thermocouple, a relay-operated switch connected to said circuit and to a source of power and a device electrically connected to said relay-operated switch which is actuated when both switches are closed in response to existing temperature and dew-point atmospheric conditions which are conducive to icing.

4. In a system for warning of icing conditions, a differential thermocouple adapted to form at one end a junction contact with an associated thermoelectric cooler and having its other end exposed to the atmosphere, a thermometric switch exposed to the atmosphere, actuatable below a predetermined atmospheric temperature and connected into said thermocouple, a voltage detecting circuit electrically connected to said thermocouple, a relay-operated switch connected to said circuit and to a source of power and warning signal device electrically connected to said relay-operated switch which is actuated when both switches are closed in response to existing temperature and dew-point atmospheric conditions which are conducive to icing.

5. In a de-icing system, a differential thermocouple adapted to form at one end a junction contact with an associated thermoelectric cooler and having its other end exposed to the atmosphere, a thermometric switch exposed to the atmosphere, actuatable below a predetermined atmospheric temperature and connected into said thermocouple, a voltage detecting circuit electrically connected to said thermocouple, a relay-operated switch connected to said circuit and to a source of power and a de-icing device electrically connected to said relay-operated switch which is actuated when both switches are closed in response to existing temperature and dew-point atmospheric conditions which are conducive to icing.

References Cited by the Examiner

UNITED STATES PATENTS

| | | | |
|---|---|---|---|
| 2,633,737 | 4/1953 | Richardson | 324—65 |
| 2,656,525 | 10/1953 | Kinsella | 340—234 |
| 2,717,957 | 9/1955 | Ohlheiser | 340—234_X |
| 3,060,417 | 10/1962 | Blake | 340—228 |

OTHER REFERENCES

H. J. Goldsmid, "Principles of Thermolectric Devices," in British Journal of Applied Physics, vol. II, June 1960.

NEIL C. READ, Primary Examiner.

ROBERT M. ANGUS, Assistant Examiner.